(12) United States Patent
Yamasaki et al.

(10) Patent No.: US 10,404,141 B2
(45) Date of Patent: Sep. 3, 2019

(54) DRIVE UNIT INCLUDING TERMINALS IN RESILIENT CONTACT WITH EACH OTHER

(71) Applicant: DENSO CORPORATION, Kariya, Aichi-pref. (JP)

(72) Inventors: Masashi Yamasaki, Obu (JP); Hideki Kabune, Nagoya (JP); Takeshi Sawada, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 458 days.

(21) Appl. No.: 14/812,733

(22) Filed: Jul. 29, 2015

(65) Prior Publication Data
US 2016/0036306 A1 Feb. 4, 2016

(30) Foreign Application Priority Data

Jul. 31, 2014 (JP) ................................. 2014-156477
Jun. 3, 2015 (JP) ................................. 2015-112996

(51) Int. Cl.
*H02K 5/22* (2006.01)
*H01R 12/51* (2011.01)
(Continued)

(52) U.S. Cl.
CPC ....... *H02K 11/0094* (2013.01); *H01R 12/515* (2013.01); *H02K 5/225* (2013.01);
(Continued)

(58) Field of Classification Search
CPC ........ H02K 5/225; H02K 15/02; H02K 29/08; Y10T 29/49009; Y10T 29/49012
(Continued)

(56) References Cited

U.S. PATENT DOCUMENTS 4,783,608 A * 11/1988 Gruber ................. H02K 5/1675
310/43
6,814,598 B2 * 11/2004 Hoffmann .............. H01R 12/58
439/249
(Continued)

FOREIGN PATENT DOCUMENTS

JP H7-122323 A 5/1995
JP H11-54174 2/1999
(Continued)

OTHER PUBLICATIONS

Machine translation of JP 2007-214085 A.*
(Continued)

*Primary Examiner* — Quyen P Leung
*Assistant Examiner* — Minki Chang
(74) *Attorney, Agent, or Firm* — Knobbe, Martens, Olson & Bear, LLP

(57) ABSTRACT

A drive unit that includes a rotating electric machine, and a controller having a substrate with electronic components mounted on the substrate, and controlling a drive of the rotating electric machine. The drive unit also includes a first terminal electrically connected to the rotating electric machine or to a power supply, and a second terminal disposed on the substrate. The second terminal has an insertion hole into which the first terminal is inserted, and has a protruding shape protruding in parallel with an insertion direction or an anti-insertion direction of the first terminal. Also, the first terminal and the second terminal are in a resilient contact with each other.

13 Claims, 11 Drawing Sheets

(51) Int. Cl.
  *H02K 11/00* (2016.01)
  *H02K 11/33* (2016.01)
  *H01R 12/57* (2011.01)
  *H01R 12/58* (2011.01)

(52) U.S. Cl.
  CPC .............. *H02K 11/33* (2016.01); *H01R 12/57* (2013.01); *H01R 12/585* (2013.01); *H02K 2211/03* (2013.01); *H02K 2213/03* (2013.01)

(58) Field of Classification Search
  USPC .......................................................... 310/71
  See application file for complete search history.

(56) References Cited

U.S. PATENT DOCUMENTS

| | | | |
|---|---|---|---|
| 7,255,612 B2* | 8/2007 | Noguchi | H01R 12/585 439/751 |
| 2004/0166701 A1* | 8/2004 | Sasaki | H01R 13/2407 439/66 |
| 2005/0239345 A1* | 10/2005 | Furuno | H01R 12/585 439/751 |
| 2008/0116755 A1* | 5/2008 | Sahara | H02K 3/522 310/71 |
| 2008/0277191 A1 | 11/2008 | Kasai | |
| 2009/0239397 A1* | 9/2009 | Masaki | H01R 43/16 439/77 |
| 2011/0254388 A1 | 10/2011 | Yamasaki | |
| 2012/0299451 A1* | 11/2012 | Choi | H02K 5/225 310/68 D |
| 2013/0234548 A1* | 9/2013 | Oishi | H02K 5/225 310/71 |
| 2013/0249335 A1 | 9/2013 | Motoda | |
| 2015/0333589 A1* | 11/2015 | De Filippis | H02K 5/10 310/71 |
| 2016/0197418 A1* | 7/2016 | Feye-Hohmann | H01R 4/4836 439/81 |

FOREIGN PATENT DOCUMENTS

| | | | |
|---|---|---|---|
| JP | 2005-323441 A | | 11/2005 |
| JP | 2007214085 A | * | 8/2007 |
| JP | 2008-206373 A | | 9/2008 |

OTHER PUBLICATIONS

U.S. Appl. No. 14/812,415, filed Jul. 29, 2015, Yamasaki, et al.
U.S. Appl. No. 14/812,757, filed Jul. 29, 2015, Yamasaki, et al.
U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,807, filed Jul. 29, 2015, Kawata, et al.
U.S. Appl. No. 14/812,769, filed Jul. 29, 2015, Kadoike, et al.
U.S. Appl. No. 14/812,730, filed Jul. 29, 2015, Yamanaka, et al.
U.S. Appl. No. 14/812,753, filed Jul. 29, 2015, Kabune.
U.S. Appl. No. 14/812,767, filed Jul. 29, 2015, Hayashi.

* cited by examiner

DRIVE UNIT INCLUDING TERMINALS IN RESILIENT CONTACT WITH EACH OTHER

CROSS REFERENCE TO RELATED APPLICATION

The present application is based on and claims the benefit of priority of Japanese Patent Application No. 2014-156477, filed on Jul. 31, 2014, and No. 2015-112996, filed on Jun. 3, 2015, the disclosure of which are incorporated herein by reference.

TECHNICAL FIELD

The present disclosure generally relates to a drive unit including terminals in resilient contact with each other.

BACKGROUND INFORMATION

Conventionally, the drive unit having a rotating electric machine and a controller for controlling the rotating electric machine, i.e., for driving the rotating electric machine is known. The controller of the drive unit has a substrate on which electronic components, e.g. a relay, a capacitor, and other electronic components, are mounted, and the substrate has terminals connected thereto for the wiring from the rotating electric machine, a power supply, and the like.

For the connection between the substrate and the terminal, a press-fit connection method which does not use soldering is known may be performed. The press-fit connection method may, for example, forcefully insert a terminal that has a resiliently-deformable press-fit portion into a piercing hole of the substrate which has a plated inner surface or into a piercing hole of a bus-bar that is mounted on the substrate. See for example a disclosure of a patent document, Japanese Patent Laid-Open No. JP 2007-326379 A (patent document 1).

However, the length of the piercing hole of a substrate which accommodates the press-fit portion of the terminal or the length of the piercing hole of the bus-bar is equal to the thickness of the substrate or the bus-bar, i.e., no substantial tolerance allowed for the positioning of the terminal in the course of inserting the terminal into the piercing hole of the substrate. In other words, an insertion work for inserting the press-fit portion of the terminal must have a high positioning accuracy. That is, the robustness of the connection between the substrate and the terminal is low.

Specifically, in the drive unit in which the terminal for an electrical connection to the rotating electric machine or to a power supply is required to be connected to the substrate, the assembly work for establishing a connection between the substrate and the terminal should be highly accurate for a reliability of the product.

SUMMARY

It is an object of the present disclosure to provide a drive unit in which a connection between the substrate and the terminal is made and secured with ease, i.e., without requiring highly accurate assembly work.

In an aspect of the present disclosure, the drive unit includes a rotating electric machine, a controller having a substrate with electronic components mounted on the substrate, and controlling a drive of the rotating electric machine, a first terminal electrically connected to the rotating electric machine or to a power supply, and a second terminal disposed on the substrate. In such drive unit, the second terminal on the substrate has an insertion hole into which the first terminal is inserted, and has a protruding shape protruding in parallel with an insertion direction or with an anti-insertion direction of the first terminal. Further, the first terminal and the second terminal are in a resilient contact with each other.

In the above-mentioned configuration, the second terminal protruding from the substrate along the insertion/anti-insertion direction of the first terminal can allow the first terminal to have some tolerance in terms of an insertion amount into the second terminal regardless of the thickness of the substrate.

For example, when the first terminal is in a resilient contact with the second terminal in an inserted state into the insertion hole of the second terminal, the first terminal is, at some position, connected to the second terminal that extends from the substrate along a direction that is in parallel with an insert direction of the first terminal. Alternatively, when first terminal is inserted into the insertion hole of the second terminal and the second terminal is in a resilient contact with the first terminal, the second terminal extending along the insertion direction of the first terminal can still contact the first terminal even if the position of the first terminal is slightly shifted/dislocated from an intended position.

Therefore, when an assembly work is performed for combining the rotating electric machine and the controller, the first terminal is connected to the substrate via the second terminal with ease, i.e., in a guaranteed manner, without requiring high assembly accuracy.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A drive unit of the present disclosure is described with reference to FIGS. 1 to 14. Like numbers in the following embodiments represent like parts, and the description of the like part will not be repeated for the brevity of the description.

The term "parallel" and "perpendicular" in the specification indicate "substantially parallel" and "substantially perpendicular", respectively, based on a well-known and commonly-used technical meaning of those terms in the art.

(First Embodiment)

A drive unit 1 in the first embodiment of the present disclosure is shown in FIGS. 1-5. The drive unit 1 of the present disclosure is applied to an electric power steering device for assisting a steering operation by a driver, for example, and outputs a steering assist torque.

(Configuration of the Drive Unit 1)

Figure 1:
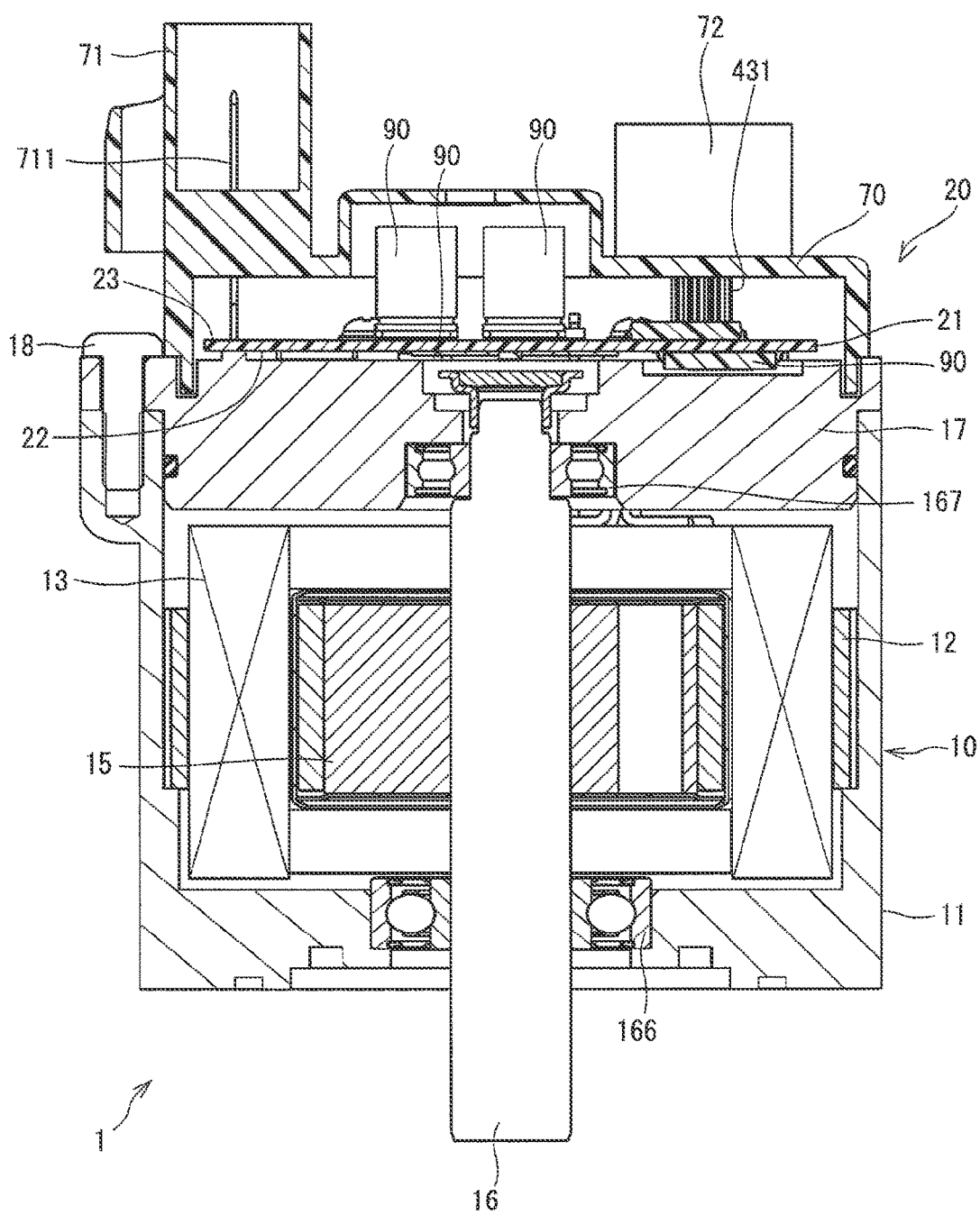
FIG. 1 is a sectional view of a drive unit in a first embodiment of the present disclosure.
Figure 2:
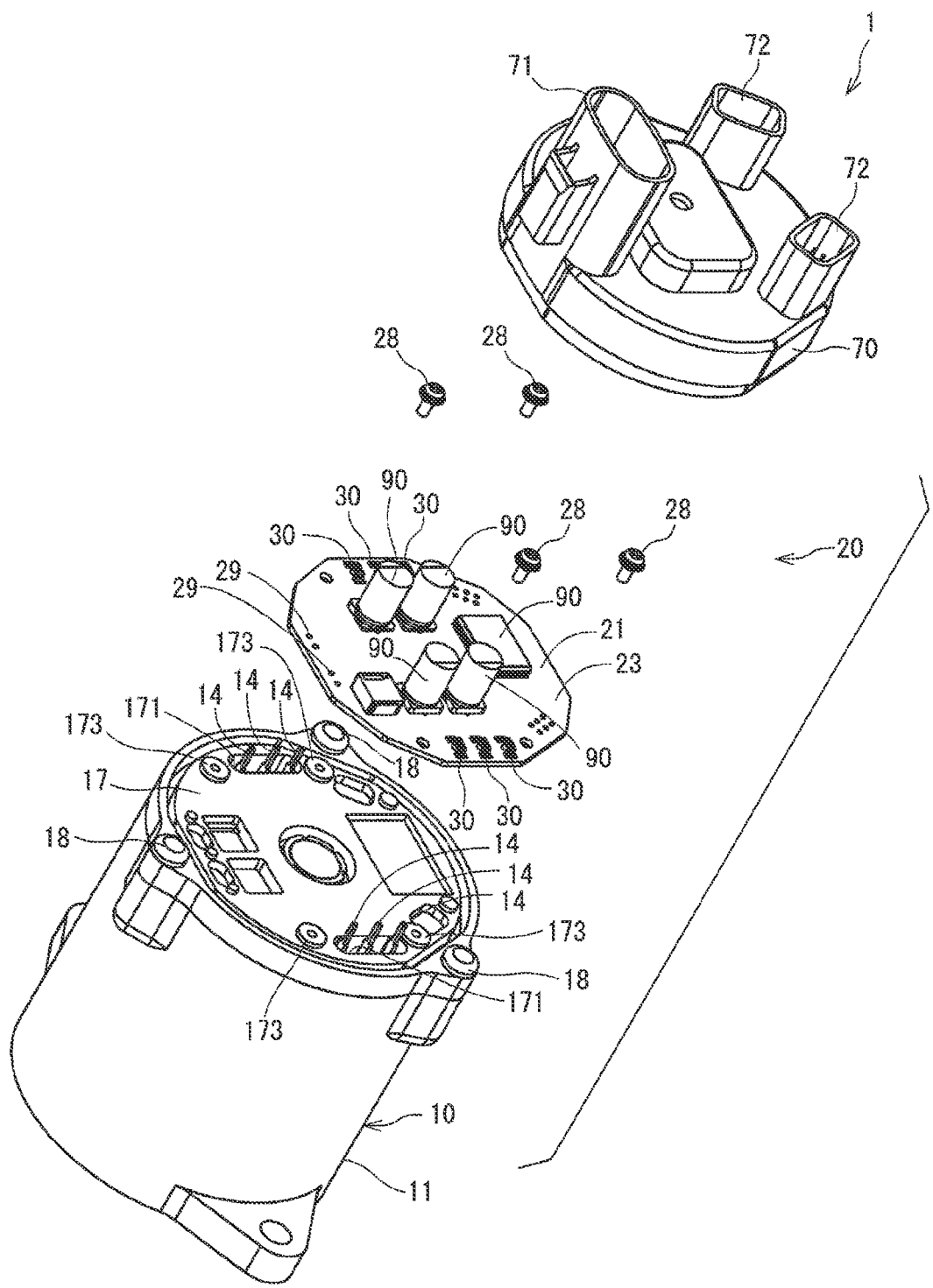
FIG. 2 is an exploded perspective view of the drive unit in FIG. 1.

First, the configuration of the drive unit 1 is described with reference to FIGS. 1 and 2.

The drive unit 1 has a motor 10, which is a rotating electric machine, and an Engine Control Unit (ECU) 20, which is a controller for controlling a drive of the motor 10, combined to have one body.

The motor 10 is a three-phase brushless motor, and is provided with a motor case 11, a stator 12, winding groups 13 in two sets, a rotor 15, a shaft 16, a frame 17 and the like. The axis of the motor 10 may be used as a reference, such as an axial direction in the following, and a radius of the motor 10 may also be used as a reference, such as a radius direction.

The motor case 11 is formed in a closed-end cylinder shape, for example with metal, such as aluminum. The frame 17 is fixed to an opening of the motor case 11 with a screw 18. The frame 17 has a substrate supporter 173 that protrudes away relative to the motor case 11 from the frame 17. The frame 17 bears a substrate 21 of the ECU 20 on an opposite side of the motor case 11, i.e., on a surface that faces away from the motor case 11, with the substrate supporter 173.

The stator 12 is fixed inside the motor case 11.

Two sets of winding groups 13 comprise a U phase coil, a V phase coil, and a W phase coil, and are wound on the stator 12, respectively. Further, from each of the phases of winding groups 13, a motor line 14 connected to the winding groups 13 and serving as a "first terminal" extends.

Further, the motor line 14 extends out from the motor 10 through a motor line insertion hole 171 of the frame 17. The motor line 14 extends out from each of the winding groups 13 at the same interval, which makes the motor lines 14 arranged in a row in one direction, and the end part of the motor line 14 having a square column shape extends along the axial direction.

The rotor 15 is disposed inside the stator 12 coaxially, i.e., in a radius inside of the stator 12. The shaft 16 has a cylinder form, for example, and is made with metal, and is fixed to an axial center of the rotor 15. The shaft 16 is held by bearings 166 and 167 that are disposed on the motor case 11 and the frame 17, and it is supported rotatably. Thereby, the shaft 16 is rotatable with the rotor 15.

The ECU 20 includes a switching element such as Metal Oxide Semiconductor Field Effect Transistor (MOSFET), various electronic components 90 such as a capacitor and the like, and the substrate 21 on which the electronic components 90 and the like are mounted, and a cover 70. According to the present embodiment, the electronic components 90 which make up the ECU 20 are mounted on one substrate 21. In such configuration, while enabling a reduction of the number of components, the volume of the drive unit 1 is also reduced, in comparison to the one having multiple substrates for forming the ECU 20.

The substrate 21 is disposed perpendicularly to the axial direction, and the substrate 21 is fixed onto the substrate supporter 173 of the frame 17 with a screw 28. One side of the substrate 21 facing the motor 10 is designated as a motor side face 22, and the other side of the substrate 21 facing away from the motor 10 is designated as a cover side face 23.

The substrate 21 has a motor line insertion hole (not illustrated) at a position where the motor line 14 is connected. Further, a motor line connection terminal 30 serving as a "second terminal" is provided at a position where the motor line 14 is connected to the substrate 21, and the terminal 30 substantially closes, i.e., covers, the motor line insertion hole on the cover side face 23 of the substrate 21. The motor line connection terminals 30 have a linear arrangement, i.e., in a row, with a preset gap interposed between each of the motor line connection terminals 30, in one-to-one correspondence to the motor lines 14.

The motor line 14 taken out from the motor line insertion hole, and has a press-fit connection to the substrate 21 via the motor line connection terminal 30. Thereby, the ECU 20 is electrically connected to the motor 10.

Similarly, the substrate 21 has a power supply connector insertion hole 29 bored at a position where a power supply connector terminal 711 is connected to the substrate 21, which is mentioned below in more details. Further, a power supply connection terminal (not illustrated) serving as a "second terminal" is provided on the motor side face 22 of the substrate 21.

The power supply connector terminal 711 is inserted into the power supply connector terminal insertion hole 29, and has a press-fit connection to the substrate 21 via the power supply connection terminal. Thereby, the ECU 20 is electrically connected to an external battery, which may also be a "power supply".

A cover 70 is provided on the opposite side of the substrate 21, i.e., opposite to the frame 17 facing side of the substrate 21. The cover 70 has a power supply connector 71 and two signal connectors 72, and covers an upper part of the substrate 21, i.e., from the above of the substrate 21. Further, the cover 70 is fixed by adhesives to the frame 17.

The power supply connector 71 is formed to receive, i.e., to be connectable to, a non-illustrated harness that extends along the axial direction from the external battery, and includes the power supply connector terminal 711 serving as the "first terminal". As mentioned above, the power supply connector terminal 711 has a press-fit connection to the power supply connection terminal that is disposed on the substrate 21.

The two signal connectors 72 are formed to be connectable to a non-illustrated harness that extends along the axial direction to in-vehicle sensors or the like, and includes a signal connector terminal 721. The signal connector terminal 721 is inserted into a non-illustrated terminal insertion hole bored on the substrate 21, and is electrically connected to the substrate 21 by soldering or the like. The ECU 20 receives from external devices a signal via the two signal connectors 72.

When manufacturing the drive unit 1 mentioned above, the motor 10 and the ECU 20 are assembled first, for example, and the cover 70 is further assembled thereafter on the assembly of the motor 10 and the ECU 20. When the motor 10 and the ECU 20 are assembled, a press-fit connection of the motor line 14 is made to the substrate 21 via the motor line connection terminal 30. Further, when assembling the cover 70, a press-fit connection of the power supply connector terminal 711 is made to the substrate 21 via the power supply connector terminal.

(Terminal Connection Structure)

Next, the terminal connection structure in the drive unit 1 is described with reference to FIGS. 3-5A/8.

In the following, the terminal connection structure between the motor line 14 and the motor line connection terminal 30 is described, in which the motor line is taken out from one of the two sets of winding groups 13 and the motor line connection terminal 30 is provided in a corresponding manner.

Figure 3:
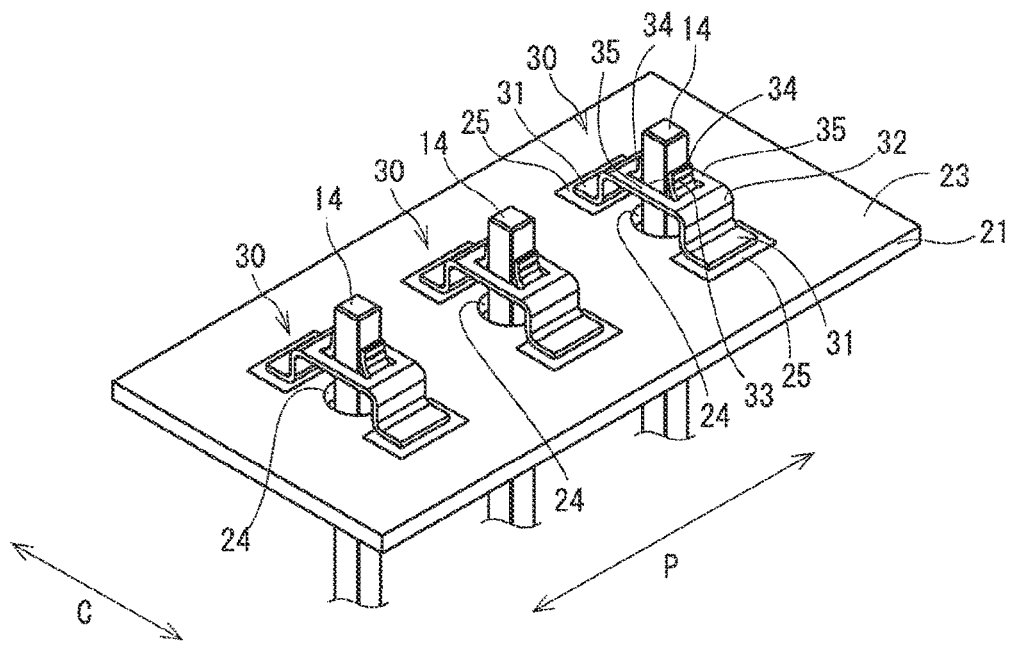
FIG. 3 is a perspective view of a terminal connection structure of the drive unit in FIG. 1.
Figure 4:
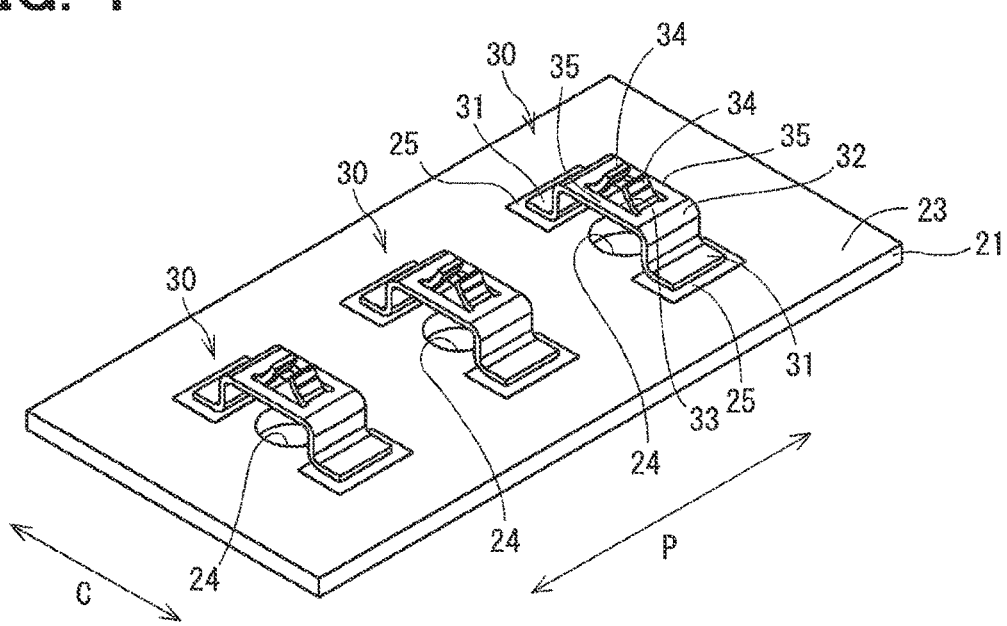
FIG. 4 is a perspective view of a motor line the connection terminal before connecting a motor line.

In the following description, the motor line connection terminal 30 is designated as a "connection terminal 30." Further, FIGS. 3 and 4 are drawn for illustration purposes only, thereby the shape of the substrate 21 is simplified to a square.

As shown in FIGS. 3 and 4, the connection terminal 30 is a metal piece mounted on the cover side face 23 of the substrate 21, and is arranged to be aligned to the motor line 14, at a corresponding position. Since three motor lines 14 extending from the winding group 13 are arranged in a row with intervals as mentioned above, the three connection terminals 30 are also arranged in a row with intervals. Here, a direction defined by the three connection terminals 30 may be designated as a pitch direction P.

The connection terminal 30 has a pair of fixing parts 31, a raised part 32, a motor line insertion hole 33, and a pair of resilient parts 34.

A pair of fixing parts 31 are fixed to a wiring 25 exposed on the substrate 21 by soldering etc. If a pair of fixing parts 31 are designated as aligned along a connection direction C, the connection direction C is perpendicular to the pitch direction P.

The raised part 32 is formed by bending a board of metal in an upside-down U shape, a very "square" U shape in this case, for example. The raised part 32 protrudes from the substrate 21 on one side, and has a gap space between itself and the substrate 21 at a position between a pair of fixing part 31 at a top portion 321. The top portion 321 of the raised part 32 has the motor line insertion hole 33 is bored thereon. The motor line insertion hole 33 is aligned with a motor line insertion hole 24 on the substrate 21 in the axial direction. When seen from the axial direction, the arrangement of the motor line insertion holes 33 and the arrangement of the motor line insertion holes 24 on the substrate 21 match, i.e., align, with each other.

A pair of resilient parts 34 is arranged in a mutually-opposing manner, having the motor line insertion hole 33 positioned in between and extending away from the top portion 321 of the raised part 32 and away from the substrate 21. A pair of resilient parts 34 resiliently contacts the motor line 14 when resiliently holding the motor line 14 from both sides thereof.

Further, a part of the top portion 321 of the raised part 32 serves as a pair of support parts 35. A pair of support parts 35 are arranged to have, i.e., to surround, the motor line insertion hole 33 in a different direction of the arrangement of the pair of resilient parts 34 while being disposed substantially in parallel with the substrate 21, thereby supporting the motor line 14 from both sides.

The connection terminal 30 constructed in the above-described manner protrudes from the substrate 21 along a direction that is in parallel with the insert direction of the motor line 14, and a pair of resilient parts 34 extend along the insertion direction.

The connection terminal 30 may be formed by performing a cut processing and a bending work to a metal plate member which has elasticity. For example, by making a cut in an H shape on the metal plate member, and bending the cut portion to the opposite side away from the substrate 21, a pair of resilient parts 34 and the motor line insertion hole 33 in between the pair of resilient parts 32 are formed, and a pair of fixing parts 31 and the raised part 32 in between are formed by bending both ends of the metal plate member to have a crank shape.

The base material of the connection terminal 30 may preferably have a low electrical resistivity, and may preferably have resilience, for example, such as a copper alloy or a phosphor bronze. The base material in this specification means a main material of a component, which make up more than half weight thereof.

As for the surface of the connection terminal 30, it is preferred that plating treatment is performed with a material that has a low electric resistivity and provides a strong anti-rust character. As the plating treatment material, tin, silver, or gold may be used, for example.

The plating treatment is not necessarily performed on an entire surface of the connection terminal 30, i.e., may only be performed partially on one side, that is, one side of the connection terminal 30 that contacts the motor line 14 and the substrate 21.

The connection method for connecting the motor line 14 and the connection terminal 30 is described with reference to FIGS. 5A and 5B.

Figure 5A:
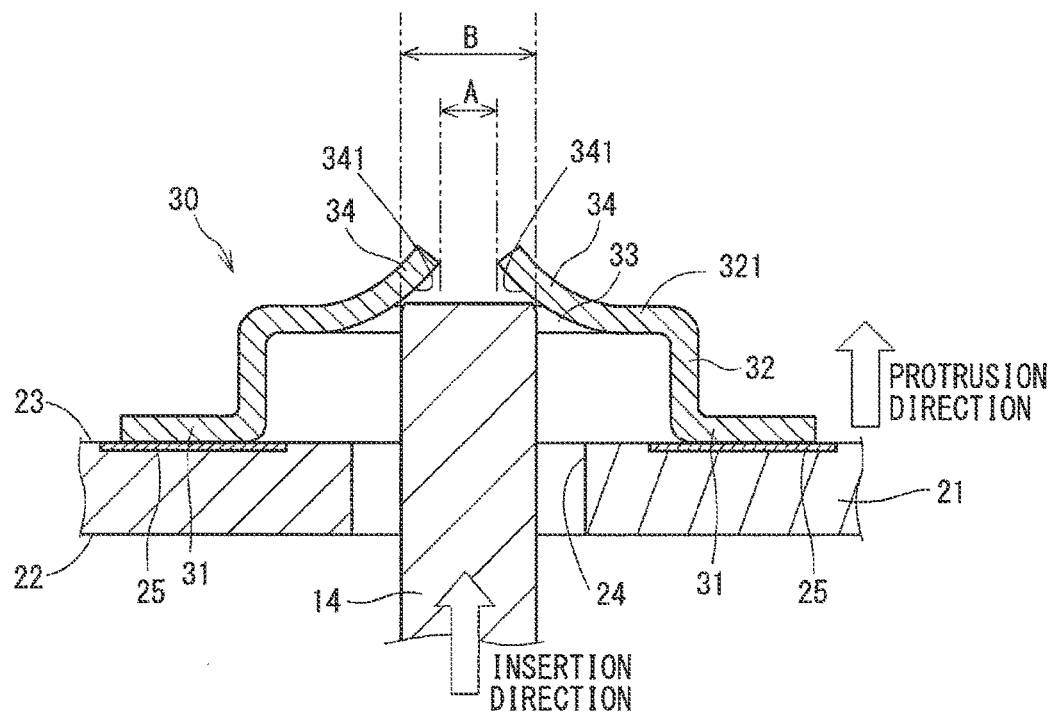
FIGS. 5A/B are sectional views of a motor line connection process before and after connecting the motor line.

First, as shown in FIG. 5A, before connecting the motor line 14 and the connection terminal 30, a gap A between two resilient parts 34 is smaller than a diameter B of the motor line 14 when those dimensions are measured along the connection direction C. Further, a pair of resilient parts 34 provide a pair of slant faces 341 that diagonally extend relative to the insertion direction.

When the motor line 14 is connected to the connection terminal 30, the motor line 14 proceeds from a motor 10 side along the perpendicular direction, i.e., perpendicular to the substrate 21, is inserted into the motor line insertion hole 24 of the substrate 21 and also is inserted into the motor line insertion hole 33 of the connection terminal 30.

In the course of such insertion, while the motor line 14 slides against a pair of slant faces 341 of the resilient parts 34, the motor line 14 proceeds in between a pair of resilient parts 34. Therefore, in the course of such insertion, a stress is applied to a pair of resilient parts 34 from the motor line 14, and the resilient parts 34 are respectively warped away from each other.

Figure 5B:
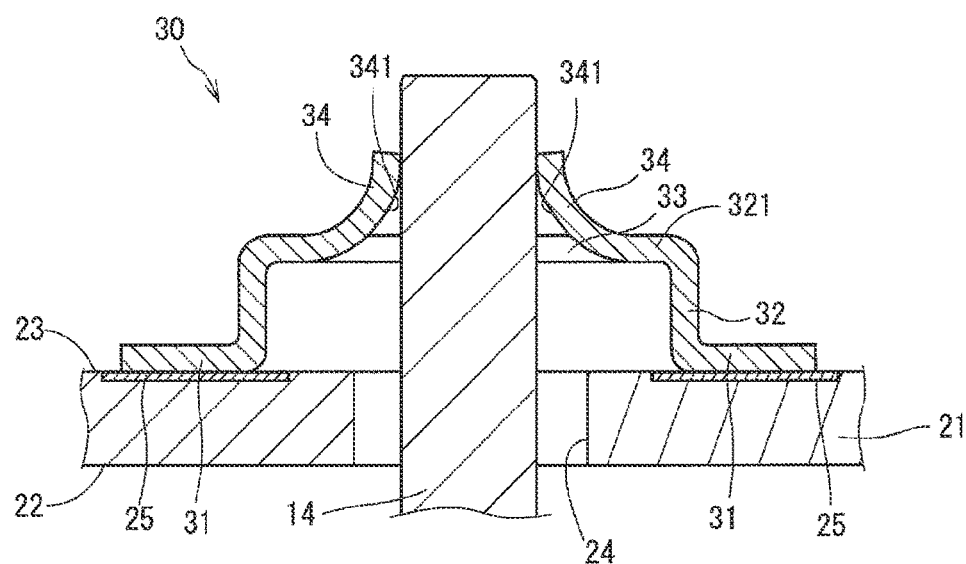

When the motor line 14 is inserted in between the pair of resilient parts 34 as shown in FIG. 5B, the pair of resilient parts 34 bind the motor line 14 from both sides, i.e., resiliently push back the motor line 14 in a binding manner. Thereby, the connection between the connection terminal 30 and the motor line 14 are firmly established.

(Effects)

As described above, the drive unit 1 of the present disclosure has the motor 10 and the substrate 21 having the electronic components 90 mounted thereon, and also has the ECU 20 for a drive control of the motor 10, the motor line 14 that is electrically connected to the motor 10, and the motor line insertion hole 33 that is bored on the substrate 21 to have the motor line 14 inserted into the motor line insertion hole 33, together with the connection terminal 30 that protrudes from the substrate 21 along the insertion direction of the motor line 14. The connection terminal 30 is in resilient contact with the motor line 14.

More practically, the connection terminal 30 has a pair of resilient parts 34 that has the motor line insertion hole 33 put in between the resilient parts 34, for resiliently holding the motor line 14. The pair of resilient parts 34 holds the motor line 14 from both sides.

In such a structure, the motor line 14 is connectable to the connection terminal 30, even when an insertion amount of the motor line 14 is somewhat different from an expected/predetermined amount, because the motor line is inserted into the motor line insertion hole 33 and the pair of resilient parts 34 of the connection terminal 30 are resiliently in contact with the motor line 14. Therefore, the insertion amount of the motor line 14 against the connection terminal 30 may have some tolerance, regardless of the thickness of the substrate 21. That is, the robustness of the connection between the motor line 14 and the connection terminal 30 along the insert direction of the motor line 14 is high.

Therefore, a press-fit connection of the motor line 14 to the substrate 21 via the connection terminal 30 is established, without high assembly accuracy.

(Other Effects)

According to the present embodiment, the pitch direction P along which the multiple connection terminals 30 are arranged and the connection direction C which is a direction of a pair of fixing parts 31 of the connection terminal 30 are respectively different from each other.

Since each of the connection terminals 30 needs to have a certain length along the connection direction C, by setting the connection direction C different from, e.g., perpendicular to, the pitch direction P, a pitch or an interval between the connection terminals 30 is reducible. Further, by setting the pitch direction P perpendicular to the connection direction C, a loop area size of the electric current path in a loop shape is reduced, thereby facilitating noise reduction characteristics of the current path.

According to the present embodiment, the base material of the connection terminal 30 has a small electrical resistivity and resilience, i.e., may be the copper alloy or the phosphor bronze, for example. Thereby, the connection terminal 30 maintains good conductivity between the motor line 14 and the substrate 21, while suitably holding the motor line 14 by the resilience of the pair of resilient parts 34.

According to the present embodiment, plating treatment with the tin, silver, or gold is performed on the surface of the connection terminal 30 for rust-proofing and the like while keeping the low electric resistivity. Therefore, the connection terminal 30 securely establishes an electrical connection between the motor line 14 and the substrate 21, while providing good conductivity.

According to the present embodiment, the following effects are provided by each of various parts of the connection terminal 30.

The connection terminal 30 has the motor line insertion hole 33 formed thereon and a space is provided between the raised part 32 and the substrate 21. Therefore, the connection terminal 30 is soldered to the substrate 21 with ease by a solder fillet having a preferable shape.

Further, an upward insertion structure in the present embodiment for inserting the motor line 14 from a lower part of the drawing toward an upper part of the drawing (e.g., in FIGS. 5A/B), i.e., from a substrate 21 side into the motor line insertion hole 33 of the terminal 30, may be simply reversed to insert the motor line 14 from an upper part of the drawing as described later in the third embodiment of the present disclosure, due to the configuration of the raised part 32.

The support parts 35 on the raised part 32 bind the motor line 14 from different sides than the pair of resilient parts 34. Therefore, the motor line 14 is more securely held by the support parts 35.

Each of a pair of resilient parts 34 has the slant faces 341 which are inclined against the insert direction of the motor line 14. Therefore, the motor line 14 is smoothly movable between a pair of resilient parts 34 while sliding against the slant faces 341 when the motor line 14 is connected to the connection terminal 30. In such structure, the slant faces 341 are contactable with the motor line 14 within the margin of deformable range, the connection between the motor line 14 and the connection terminal 30 is securely established.

(Second Embodiment)

Figure 6:
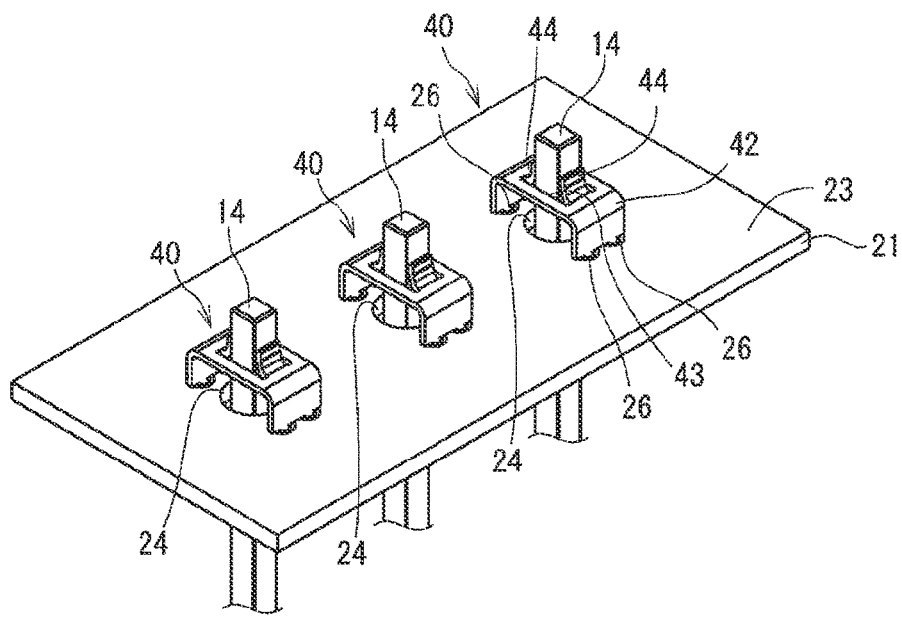
FIG. 6 is a perspective view of the terminal connection structure of the drive unit in a second embodiment of the present disclosure.
Figure 7:
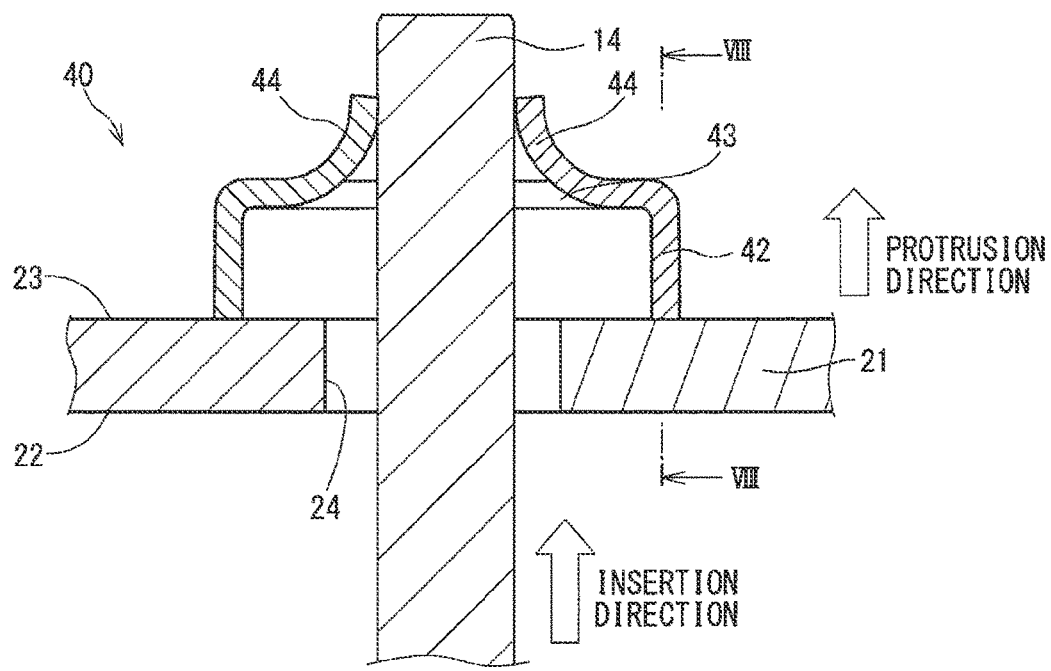
FIG. 7 is a sectional view of the terminal connection structure of FIG. 6.
Figure 8:
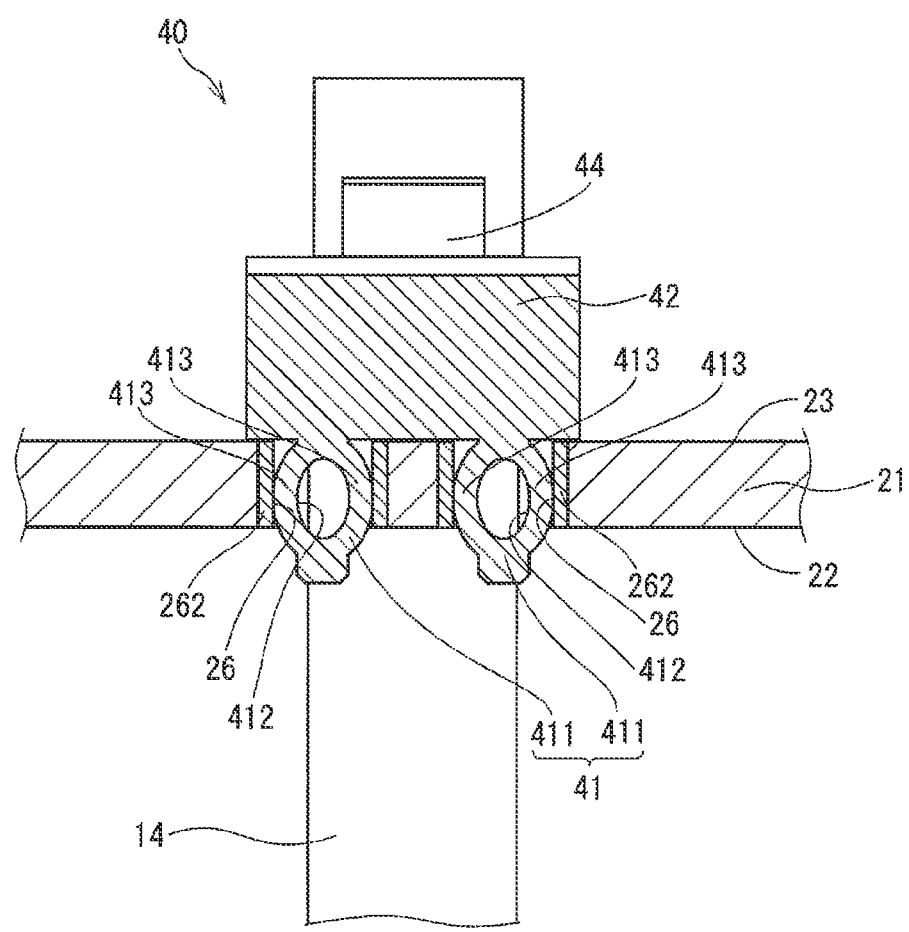
FIG. 8 is a sectional view along a line in FIG. 7.

The terminal connection structure of the drive unit in the second embodiment of the present disclosure is shown in FIGS. 6-8. FIG. 6 is a simplified illustration, just like FIGS. 3 and 4, in which the substrate 21 is shown in a square shape, for showing a disposition area of connection terminals 40 only.

According to the second embodiment, the method of fixing the connection terminal 40 to the substrate 21 is different from the first embodiment. The following description focuses on such a difference.

As shown in FIGS. 6-8, the connection terminal 40 has a pair of fixing parts 41, a raised part 42, a motor line insertion hole 43, and a pair of resilient parts 44.

In the present embodiment, a fixing part 41 comprises two press-fit ends 411 which have elasticity, respectively. The press-fit end 411 protrudes from the raised part 42 toward substrate 21, and has a piercing hole 412 piercing the end 411 bored in parallel with the substrate 21.

Configurations of other parts, i.e., the raised part 42, the motor line insertion hole 43, and a pair of resilient parts 44, are the same as the first embodiment.

The substrate 21 has a piercing hole 26, on which a metal plating 262 is performed, which is different from the wiring 25 in the first embodiment. Before the connection terminal 40 is fixed to the substrate 21, the width of the press-fit end 411 is larger than the diameter of the piercing hole 26. The connection terminal 40 is connected to the substrate 21 by press-fitting of the press-fit end 411 fit into the piercing hole 26. When the press-fit end 411 is press-fitted, both sides 413 of the piercing hole 412 resiliently deform to make the hole 412 narrower.

According to the present embodiment, not only the connection between the motor line 14 and the connection terminal 40 but also the connection between the connection terminal 40 and the substrate 21 are established by press-fitting, which makes it unnecessary to perform the soldering for the connection of the motor line 14 to the substrate 21.

(Third Embodiment)

Figure 9:
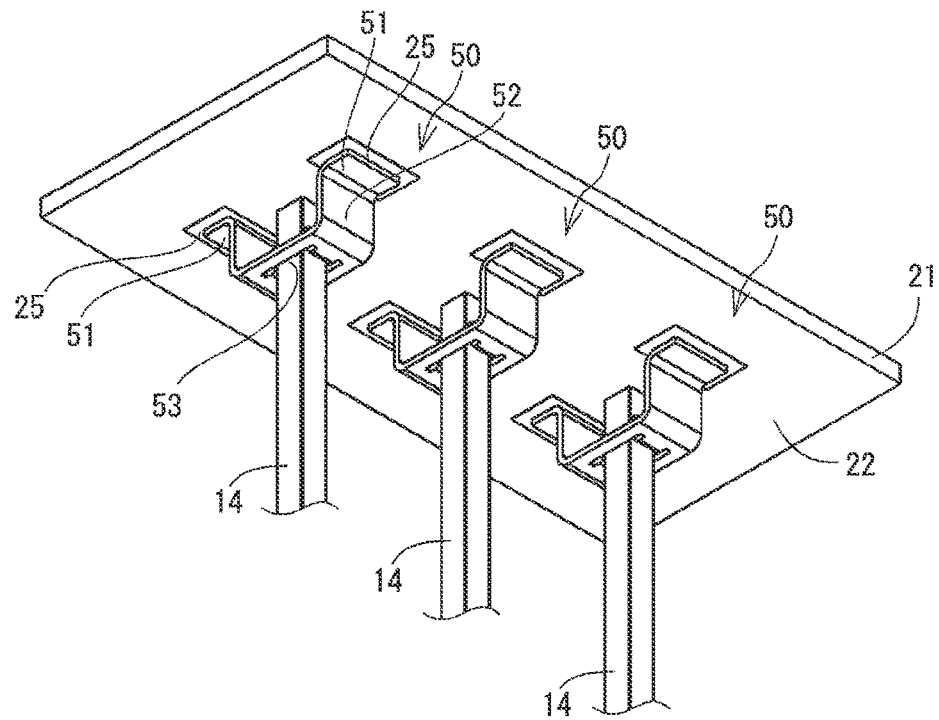
FIG. 9 is a perspective view of the terminal connection structure of the drive unit in a third embodiment of the present disclosure.
Figure 10:
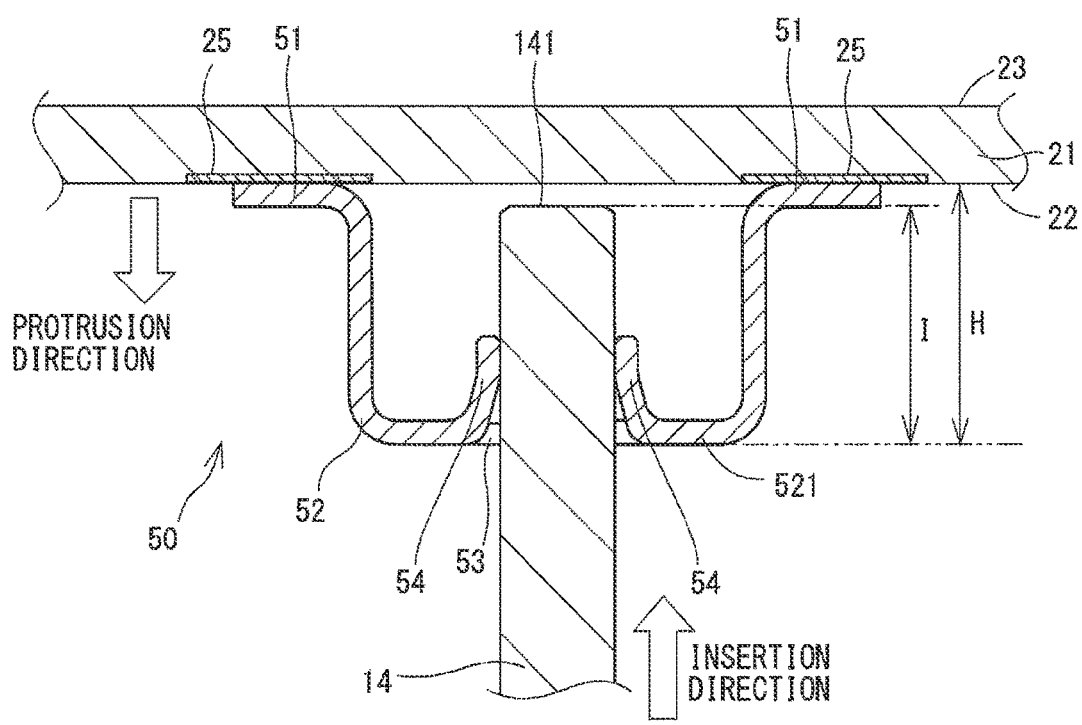
FIG. 10 is a sectional view of the terminal connection structure of FIG. 9.

The terminal connection structure of the drive unit in the third embodiment of the present disclosure is shown in FIGS. 9-10. FIG. 9 is a simplified illustration, just like FIGS. 3 and 4, in which the substrate 21 is shown in a square shape, for showing a disposition area of connection terminals 50 only.

In the third embodiment, the connection terminals 50 are disposed on the opposite side of the substrate 21, i.e., the opposite side relative to the one having the terminals in the first embodiment. The following description focuses on such a difference.

As shown in FIGS. 9 and 10, the connection terminal 50 is disposed on the motor side face 22 of the substrate 21. The connection terminal 50 has a pair of fixing parts 51, a raised part 52, a motor line insertion hole 53, and a pair of resilient parts 54.

According to the present embodiment, a pair of resilient parts 54 respectively extend diagonally from a top part 521 of the raised part 52 toward the substrate 21. Since the raised part 52 defines a space between itself and the substrate 21, a pair of resilient parts 54 are enabled to extend, or to warp, toward the substrate 21. In other words, the resilient parts 54 may extend in an opposite direction, which is opposite to the protrusion direction of the connection terminal 50. A pair of resilient parts 54 may be formed by cutting a metal board to make an H shape slit and by bending the upper and lower "tongues" upward toward the substrate 21.

Configurations of other parts, i.e., a pair of fixing parts 51, the raised part 52, and the motor line insertion hole 53 are the same as the first embodiment.

Unlike the first embodiment, the motor line insertion hole is not bored on the substrate 21. The motor line 14 is inserted into the motor line insertion hole 53 of the connection terminal 50 from the opposite side of the substrate 21.

Further, an end surface 141 of the motor line 14, which is inserted into the motor line insertion hole 53, faces the substrate 21 with a gap interposed between motor line 14 and the substrate 21. In other words, a height H of the connection terminal 50 along the protrusion direction is greater than an amount I of insertion of the motor line 14 (refer to FIG. 10).

According to the present embodiment, no hole making process is required to bore a hole on the substrate 21.

The protrusion direction of the connection unit 50 and the insert direction of the motor line 14 are opposite to each other. In other words, the connection terminal 50 protrudes along the anti-insertion direction of the motor line 14. Therefore, an insertion force for inserting the motor line 14 pushes both of a pair of fixing parts 51 toward the substrate 21 when the motor line 14 is inserted into the hole 53 and is connected to the connection terminal 50. Therefore, there is no need to worry about a drop, i.e., a tear away, of the connection terminal 50 from the substrate 21 by the above-described insertion force applied to the motor line 14, and the connection of the connection terminal 50 is secured.

As for the plating treatment of the connection terminal 50, the connection terminal 50 may preferably have the treatment on both sides, since the connection terminal 50 contacts the motor line 14 and the substrate 21 with two respectively different surfaces.

(Fourth Embodiment)

Figure 11:
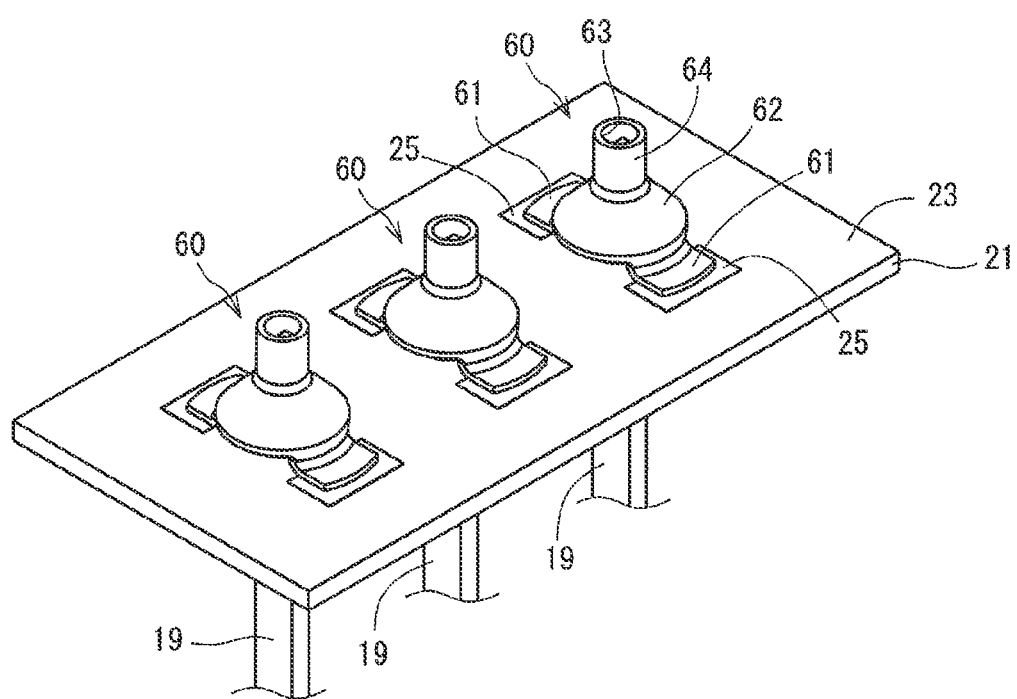
FIG. 11 is a perspective view of the terminal connection structure of the drive unit in a fourth embodiment of the present disclosure.
Figure 12:
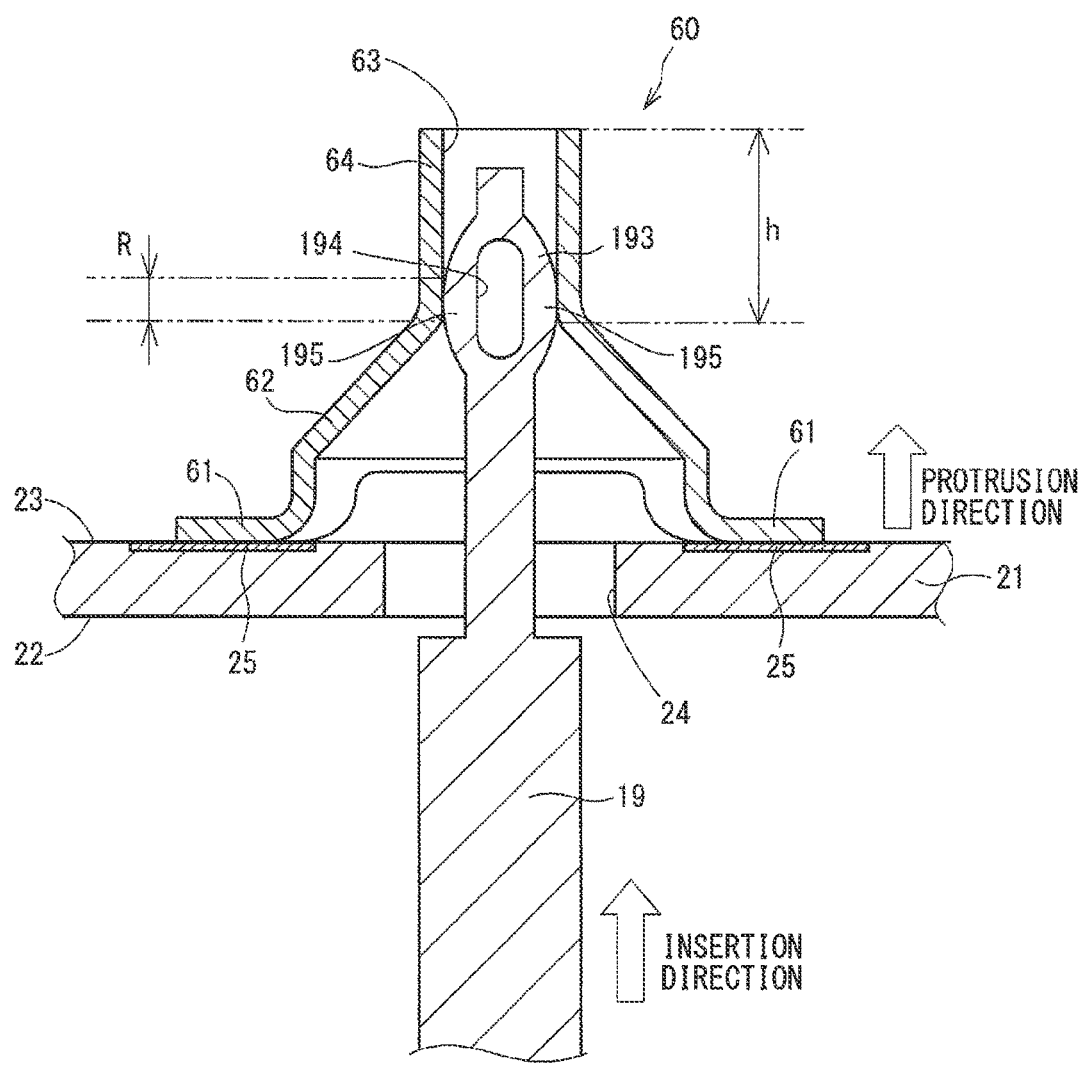
FIG. 12 is a sectional view of the terminal connection structure of FIG. 11.

The terminal connection structure of the drive unit in the fourth embodiment of the present disclosure is shown in FIGS. 11 and 12. FIG. 11 is a simplified illustration, just like FIGS. 3 and 4, in which the substrate 21 is shown in a square shape, for showing a disposition area of connection terminals 60 only.

According to the fourth embodiment, a motor line 19 serves as a "first terminal" and the connection terminal 60 serves as a "second terminal," both of which have different configuration from the first embodiment. The following description focuses on such a difference.

As shown in FIGS. 11 and 12, the connection terminal 60 has a pair of a pair of fixing parts 61, a taper part 62, and a cylinder part 64.

A pair of fixing parts 61 are fixed onto a wiring 25 that is exposed and provided on the substrate 21 by soldering etc.

The taper part 62, having a turned funnel shape, is disposed at a position between a pair of fixing parts 61, and a diameter of the taper part 62 reduces along the height thereof, which is measured in parallel with the surface of the substrate 21.

The cylinder part 64, having a cylinder shape, has a hollow space in an inside, and is disposed on a small diameter side of the taper part 62. The axis of the cylinder part 64 is in parallel with the insert direction of the motor line 19. Further, an inner surface of the cylinder part 64 serves as a motor line insertion hole 63.

The connection terminal 60 constructed as mentioned above protrudes from the substrate 21 substantially along a direction that is in parallel with the insertion direction of the motor line 19, and the cylinder part 64 extends along the insertion direction.

Regarding the base material and the plating treatment of the connection terminal 60, the same configuration as the first embodiment applies.

The motor line 19 has the same configuration as the first embodiment, except for a part that one end of the line 19 has a press-fit portion 193. The press-fit portion 193 may have an oval shape, having a hole 194 bored therein along a diameter direction of the motor line 19, for example. The press-fit portion 193 may be press-fitted to resiliently contact an inside of the cylinder part 64.

How the motor line 19 and the connection terminal 60 are connected is described in the following.

First, before the motor line 19 is connected to the terminal 60, a diameter of the press-fit portion 193 is greater than an inner diameter of the cylinder part 64, which are respectively measured in parallel with the substrate 21.

For the connection of the motor line 19 and the connection terminal 60, the motor line 19 proceeds from the opposite side of the substrate 21 relative to the terminal 60 perpendicularly toward the substrate 21, is inserted into the motor line insertion hole 24 of the substrate 21, and is also inserted into the motor line insertion hole 63 of the connection terminal 60. In the course of such insertion, the press-fit portion 193 of the motor line 19 is guided by the taper part 62, and is press-fitted into an inside of the cylinder part 64. When the press-fit portion 193 is press-fitted, both sides 195 of the hole 194 resiliently deform to make the hole 194 narrower.

After a predetermined amount of the motor line 19 is inserted into the motor line insertion hole 63, the press-fit portion 193 exerts from itself a reactive force, i.e., resiliently pushes back the cylinder part 64. Thereby, the connection terminal 60 and the motor line 19 are firmly connected.

Further, the press-fit portion 193 contacts the cylinder part 64 by a certain amount of contacting surface. Here, along the direction perpendicular to the substrate 21, a height h of the cylinder part 64 is configured to be greater than a contact range R of the press-fit portion 193 (refer to FIG. 12). Therefore, the press-fit portion 193 is suitably guided and is resiliently press-fitted into the cylinder part 64, even in case that the press-fit portion 193 is not accurately positioned at the center of the cylinder part 64 in a view along the insertion direction. That is, highly-robust assembly structure is devised along the insertion direction for the connection work of the motor line 19 and the connection terminal 60.

As described above, according the fourth embodiment, the motor line 19 is in resilient contact with the cylinder part 64 of the connection terminal 60 while being inserted into the motor line insertion hole 63. Therefore, the motor line 19 is contactable to some part of the cylinder part 64 that extends along the insertion direction, even if the motor line 19 is shifted from a preset position. Thus, the insertion amount of the motor line 19 into the connection terminal 60 has some tolerance regardless of the thickness of the substrate 21. In other words, a connection structure between the motor line 19 and the connection terminal 60 has a high robustness along the insertion direction.

Therefore, a connection between the motor line 19 and the connection terminal 60 is established robustly without requiring highly accurate assembly work in the course of assembly work of the motor 10 and the substrate 21.

Fifth Embodiment

Figure 13:
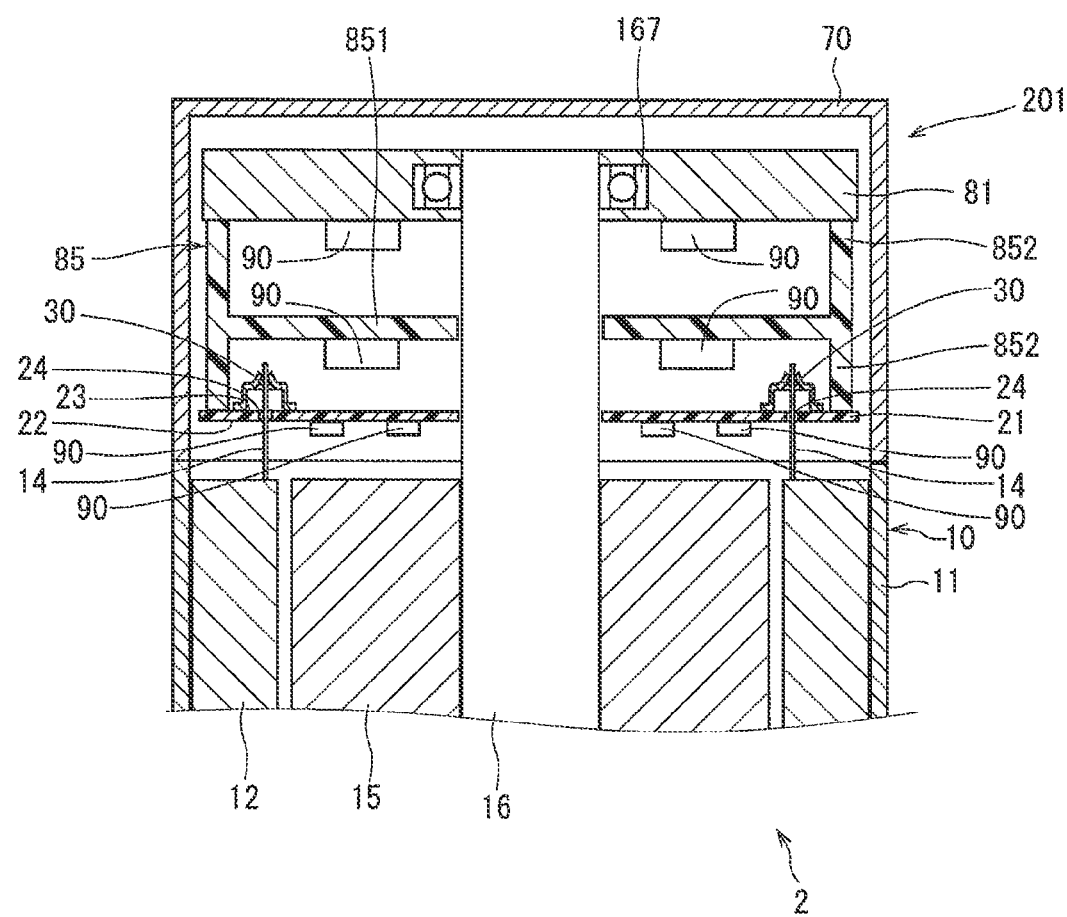
FIG. 13 is a sectional view of the drive unit in a fifth embodiment of the present disclosure.

A drive unit 2 according to the fifth embodiment of the present disclosure is shown in FIG. 13, in which a sectional view of the drive unit 2 is shown only with representative components.

The drive unit 2 in the fifth embodiment has an ECU 201 which is different from the above-described embodiments.

The ECU 201 has the substrate 21, a middle part 85, and a heat sink 81 arranged in order from the motor 10 side.

The middle part 85 has a board member 851 and a periphery wall 852. The board member 851 has a round disk shape. The periphery wall 852 stands on the periphery of the board member 851 to extend toward both of the substrate 21 and the heat sink 81. The substrate 21 and the middle part 85 are electrically connected with each other by a wiring pattern, for example. At a center part of the substrate 21 and the board member 851, a hole is bored for the insertion of the shaft 16. At a center part of the heat sink 81, a bearing 167 for rotatably holding the shaft 16 is disposed.

In the fifth embodiment, the electronic components 90 are disposed not only on the substrate 21, but also on the board member 851 and the heat sink 81. The electronic components 90 are connected to the middle part 85 by a terminal or the like which is not illustrated.

Further, in the fifth embodiment, the cover side face 23 of the substrate 21 has the connection terminal 30, and the motor line 14 taken out from the motor 10 is connected to the connection terminal 30 by press-fitting.

In the above-described configuration, the same effects as the above-described embodiments are achievable.

The power supply connector terminal serving as the "first terminal" in the fifth embodiment may be connected to the "second terminal" disposed on the board member 851 of the middle part 85 (not illustrated). In such case, the board member 851 may be considered as the "substrate".

(Sixth Embodiment)

Figure 14:
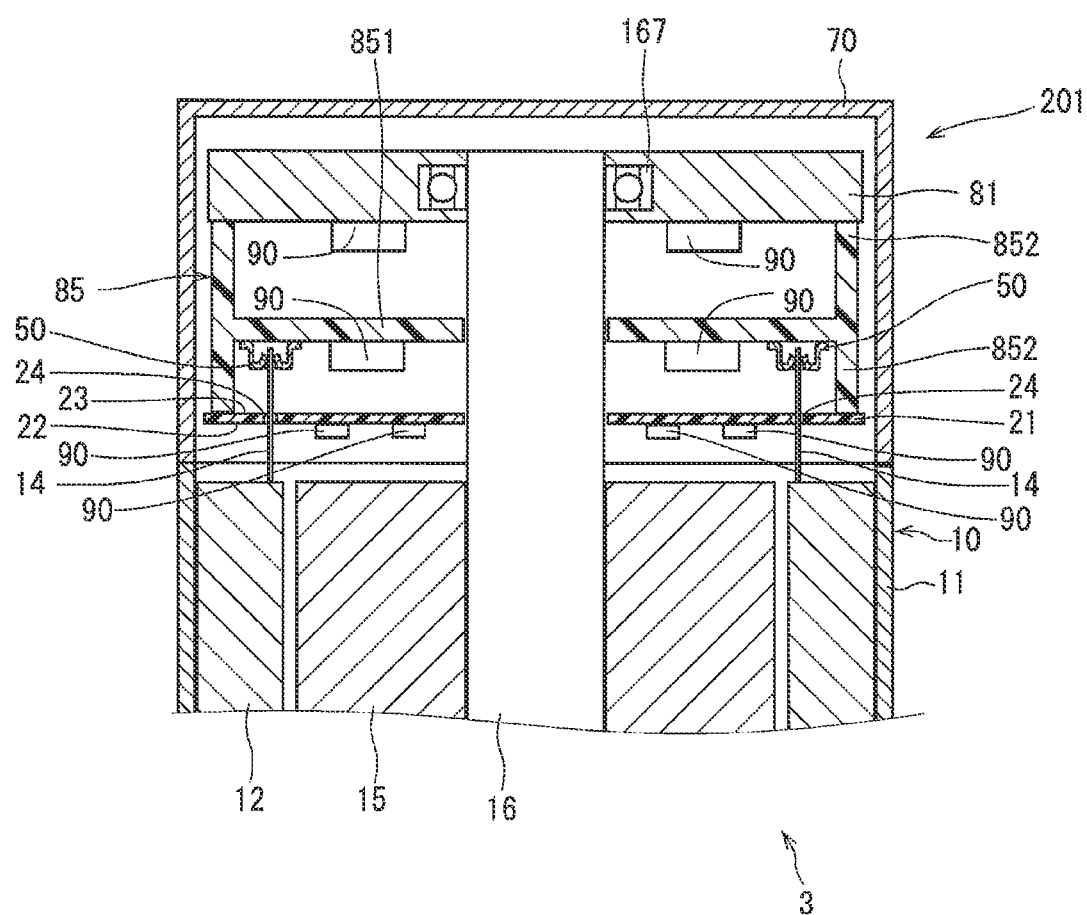
FIG. 14 is a sectional view of the drive unit in a sixth embodiment of the present disclosure.

The sixth embodiment of the present disclosure is described as a drive unit 3 in FIG. 14. FIG. 14 shows a sectional view of the drive unit 3, with only representative components illustrated therein.

The drive unit 3 in the sixth embodiment is different from the fifth embodiment by the arrangement of the connection terminal 50.

The connection terminal 50 in the sixth embodiment is disposed on a motor 10 side face of the board member 851. The motor line 14 is connected to the connection terminal 50 by press-fitting while being inserted into the motor line insertion hole 24 of the substrate 21. Therefore, the board member 851 may be considered as the "substrate" in the sixth embodiment.

In the above-described configuration, the same effects as the above-described embodiments are achievable.

(Other Embodiments)

Although the present disclosure has been described in connection with preferred embodiment thereof with reference to the accompanying FIG.s, it is to be noted that various changes and modifications will become apparent to those skilled in the art.

(a) Motor Line Connection Terminal

In the first to third embodiments, the connection terminals 30, 40, 50 have a pair of resilient parts 34, 44, 54. However, the resilient parts may be provided as three or more parts. For example, when the end part of the motor line 14 has a polygonal shape of equal element length, each element of such polygonal shape of the motor line 14 may be respectively contacted by three or more resilient parts. That is, the number of resilient parts may be changeable according to the number of elements of the cross section shape of the end part of the motor line 14.

Further, the connection terminals 30, 40, 50, 60 having a pair of fixing parts 31, 41, 51, 61 in the above-mentioned embodiment may be modified to have three or more fixing parts.

In the above-mentioned embodiment, the connection direction C along which a pair of fixing parts 31, 41, 51, 61 are arranged is perpendicular to the pitch direction P by which a linear arrangement of the connection terminals 30, 40, 50, 60 is defined. However, the pitch direction P may not be necessarily perpendicular to the connection direction C. That is, the pitch direction P may be arbitrarily arranged depending on the configuration and circuitry of the substrate 21.

(b) Power Supply Connector Terminal and Power Supply Connection Terminal

In the above-mentioned embodiment, the connection structure between the motor lines 14 and 19 of the motor 10 and the motor line connection terminals 30, 40, 50, 60 is mainly discussed.

The same applies to the connection structure between the power supply connector terminal 711 connected to the power supply and the power supply connection terminal.

That is, the power supply connector terminal 711 may have the same configuration as the motor line 14, 19, and the power supply connection terminal may have the same configuration as the motor line connection terminals 30, 40, 50, 60.

Thereby, a connection between the power supply connector terminal 711 and the power supply connection terminal is established in the course of the assembly work of the substrate 21 and the cover 70, without requiring high accuracy of the assembly work.

(c) Substrate

The motor line insertion hole may be bored on the substrate 21 in the third embodiment. That is, the motor line 14 may be inserted into the motor line insertion hole 53 of the connection terminal 50 from the opposite side, and may further be inserted into the motor line insertion hole that is bored on the substrate 21.

(d) Motor

In the above-mentioned embodiment, the motor 10 is a three-phase brushless motor. In other embodiments, the motor 10 may be other than the three-phase brushless motor, i.e., may be a DC motor with a brush, or any other type of motor.

(e) ECU

In the first to fourth embodiments, the ECU 20 is made by a single substrate 21 and the electronic components mounted on the substrate 21. In other embodiments, the ECU 20 may be made by, for example, multiple substrates and the electronic components on the multiple substrates.

The ECU 201 in the fifth embodiment has the connection terminal 30 disposed on the substrate 21. In other embodiments, the substrate 21 may have the connection terminals 40, 50, 60 in the other embodiments. Similarly, the ECU 201 in the sixth embodiment has the connection terminal 50 disposed on the board member 851. In other embodiments, the ECU 201 may have, on the board member 851, the connection terminals 30, 40, 60 from the other embodiments.

(f) Drive Unit

In the above-described embodiments, the output end of the drive units 1 to 3 connected to the gear is disposed on the opposite side of the ECU 20, 201 relative to the motor 10. In other words, the output end, the motor 10, and the ECU 20, 201 are arranged in this written order.

In other embodiments, the output end may be disposed on an opposite side of the motor relative to the ECU. In other words, the drive unit in other embodiments may have a configuration, in which the motor, the ECU, and the output end are arranged in this written order.

Such changes, modifications, and summarized scheme are to be understood as being within the scope of the present disclosure as defined by appended claims.

What is claimed is:

1. A drive unit comprising:
a rotating electric machine;
a controller having a substrate with electronic components mounted on the substrate, and controlling a drive of the rotating electric machine;
a first terminal electrically connected to the rotating electric machine; and
a second terminal disposed on a surface of the substrate that faces the rotating electric machine, wherein
the second terminal has an insertion hole through which the first terminal is inserted, wherein the first terminal contacts a resilient portion of the second terminal, and wherein
the resilient portion of the second terminal that contacts the first terminal extends in a direction toward the surface of the substrate that faces the rotating electric machine, and wherein
the rotating electric machine has a motor case, a stator, a coil of a winding group wound around the stator, and a frame that is disposed on an opening side of the motor case, and wherein
the substrate is disposed perpendicular to an axial direction of the rotating electric machine, and wherein
the first terminal is a motor line electrically connected to the winding group, the motor line extending through a motor line insertion hole of the frame toward the substrate, and wherein
an end part of the motor line is positioned to resiliently contact the second terminal on the rotating electric machine facing surface of the substrate.

2. The drive unit of claim 1, wherein the second terminal has at least two resilient parts that resiliently hold the first terminal within the insertion hole that is in between the at least two resilient parts.

3. The drive unit of claim 2, wherein the second terminal has a pair of the at least two resilient parts for holding the first terminal from both sides of the second terminal.

4. The drive unit of claim 2, wherein
the second terminal has the insertion hole and a raised part that defines a space interposed between the raised part and the substrate, and
the at least two resilient parts extend from the raised part.

5. The drive unit of claim 1, wherein one end part of the first terminal and the substrate are interposed with a gap.

6. The drive unit of claim 1, wherein
the first terminal has a resilient press-fit part on one end,
the second terminal has a cylinder part in which the insertion hole is formed, and
the press-fit part is press-fitted in the cylinder part.

7. The drive unit of claim 1, wherein
the first terminal and the second terminal are disposed at plural positions with an interval along a pitch direction,
the second terminal has a pair of fixing parts that are fixedly disposed on the substrate, and
a line defined by the pair of fixing parts extends in a direction that is different from the pitch direction.

8. The drive unit of claim 1, wherein the first terminal is made by a material comprising one of a copper alloy or a phosphor bronze.

9. The drive unit of claim 1, wherein the first terminal has a surface plating of tin, silver, or gold.

10. The drive unit of claim 1 further comprising:
a plurality of motor lines; and
a plurality of second terminals, wherein
each of the plurality of motor lines is correspondingly paired with one of the plurality of second terminals, wherein each corresponding pair is formed of one motor line and one second terminal.

11. A drive unit comprising:
a rotating electric machine;
a controller having a substrate with electronic components mounted on the substrate, the controller configured to control a drive of the rotating electric machine;
a first terminal electrically connected to the rotating electric machine or to a power supply; and
a second terminal disposed on the substrate and having a pair of opposing fixing parts in electrical connection with the substrate and an insertion hole into which the first terminal is inserted, wherein
each of the pair of opposing fixing parts has a protrusion with a first portion extending in a direction toward the rotating electric machine and a second portion extending toward the substrate, the second portion configured to be resilient, and wherein
a space bounded by the second portions forms the insertion hole, and wherein,
when the first terminal is inserted into the insertion hole, the second terminal contacts the first terminal.

12. The drive unit of claim 11, wherein each of the protrusions has a curved portion, the curved portion having a convex side and a concave side, the convex side oriented toward an insertion direction of the first terminal into the second terminal, and wherein
the curved portion is configured to deform when an insertion force from the first terminal is exerted on the second portion of the protrusion, and wherein,
when the first terminal contacts the second portions in a pair of opposing fixing parts, the insertion force exerted on the second portions urges each second portion of the pair away from one another, and wherein,
when the curved portion is deformed, a resilient force is generated and stored in the curved portion, and wherein
after the curved portions in the pair of opposing fixing parts are deformed, the curved portions provide the stored resilient force to the second portions to urge each of the second portions toward one another.

13. The drive unit of claim 12, wherein when the first terminal contacts the second portions to deform the curved portions in the pair of the opposing fixing parts when the first terminal is in the insertion hole, the resilient force provided to the second portions urge the second portions to maintain contact with the first terminal.

* * * * *